United States Patent [19]
Kajita et al.

[11] Patent Number: 5,496,496
[45] Date of Patent: Mar. 5, 1996

[54] PROCESS FOR PRODUCING POLYURETHANE ELASTOMERS

[75] Inventors: Yasuyuki Kajita, Suita; Tsutomu Kubota, Shimamoto; Kenji Kudo, Suita, all of Japan

[73] Assignee: Takeda Chemical Industries, Ltd., Osaka, Japan

[21] Appl. No.: 15,799

[22] Filed: Feb. 10, 1993

[30] Foreign Application Priority Data

Feb. 18, 1992 [JP] Japan .................................. 4-031033

[51] Int. Cl.$^6$ ................. C08G 18/32; C08G 18/42; C08G 18/48
[52] U.S. Cl. ................. 252/182.24; 252/182.27; 252/182.28; 528/60; 528/65; 528/66; 528/74.5; 528/76; 528/77; 528/79; 528/80; 528/81; 528/83; 528/85
[58] Field of Search ................. 528/60, 65, 66, 528/76, 77, 79, 80, 81, 83, 85, 74.5; 252/182.24, 182.27, 182.28

[56] References Cited

U.S. PATENT DOCUMENTS

| Re. 31,671 | 9/1984 | Bonk et al. | 528/77 |
|---|---|---|---|
| 3,839,284 | 10/1974 | Mohajer | 528/79 |
| 3,892,713 | 7/1975 | Burkus et al. | 528/60 |
| 4,119,594 | 10/1978 | Iobst et al. | 528/77 |
| 4,695,618 | 9/1987 | Mowrer | 528/77 |
| 4,732,957 | 3/1988 | Schuster et al. | 528/77 |
| 4,739,027 | 4/1988 | Mendelsohn et al. | 528/77 |
| 4,868,223 | 9/1989 | Nelson et al. | 528/77 |
| 4,877,856 | 10/1989 | Hall et al. | 528/79 |
| 4,925,732 | 5/1990 | Driskill et al. | 428/336 |
| 4,956,439 | 9/1990 | Tong et al. | 528/53 |
| 5,021,534 | 6/1991 | Kawasaki et al. | 528/60 |
| 5,066,762 | 11/1991 | Ohbuchi et al. | 528/85 |

FOREIGN PATENT DOCUMENTS

| 0316150 | 5/1989 | European Pat. Off. . |
|---|---|---|
| 0449331 | 10/1991 | European Pat. Off. . |
| 56-57817 | 5/1981 | Japan . |
| 2220670 | 1/1990 | United Kingdom . |

*Primary Examiner*—James J. Seidleck
*Assistant Examiner*—Rabon Sergent
*Attorney, Agent, or Firm*—Wenderoth, Lind & Ponack

[57] ABSTRACT

A method for producing a polyurethane elastomer which comprises reacting (1) either a polyisocyanate and a polyol or an isocyanate-terminated prepolymer obtainable by reacting said polyisocyanate with said polyol with (2) a diol of general formula

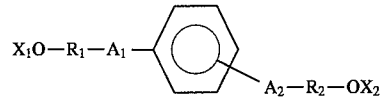

wherein $A_1$ and $A_2$ are the same or different and each represents a bond, —O— or —COO—; $R_1$ and $R_2$ are the same or different and each represents $C_{1-6}$ alkylene; $X_1$ and $X_2$ are the same or different and each represents H or hydroxyalkyl and (3) a triol having a hydroxyl equivalent of 60 to 500, gives a polyurethane elastomer with improved tensile strength, tear strength and other mechanical properties.

1 Claim, No Drawings

PROCESS FOR PRODUCING POLYURETHANE ELASTOMERS

FIELD OF THE INVENTION

The present invention relates to a production process by which a polyurethane elastomer having excellent mechanical strength can be provided safely without health hazards and with improved workability.

BACKGROUND OF THE INVENTION

By virtue of their satisfactory mechanical, thermal and chemical properties, polyurethane elastomers are in broad use in various applications including industrial rolls and belts, business machine parts and so on.

For the production of such polyurethane elastomers, there is known a process which comprises reacting an isocyanate-terminated prepolymer, which has been prepared by reacting a polyol with a stoichiometric excess of a polyisocyanate, with a curing agent. In that production process, 4,4'- methylenebis-2-chloroaniline (hereinafter referred to as MOCA) is commonly used as the curing agent. The polyurethane elastomer obtainable with such a known curing agent, typically MOCA, has laudable mechanical and thermal properties but the oncogenicity, recently uncovered, of MOCA caused many apprehensions and its use is now restricted from the standpoint of labor safety and hygiene.

These circumstances gave impetus to research endeavors to find new curing agents that may be substituted for MOCA and so far several compounds including bis(β-hydroxyethoxy)benzene (hereinafter referred to as BHEB), p-xylylene glycol (hereinafter referred to as P-XG) and bis(β-hydroxyethyl) terephthalate (hereinafter referred to as BHET) have been proposed as candidates. However, melting only at high temperatures over the melting point (about 98° C.) of MOCA, these compounds tend to crystallize on blending with the prepolymer, thus failing to provide a homogeneous blend and maintaining the temperature of the system at a high temperature to prevent crystallization presents workability problems. Moreover, the elastomers obtainable with these curing agents are too high in hardness to exhibit the necessary elasticity.

To overcome the above workability problem associated with curing agents, it has been proposed to employ a blend of BHEB with 1,4-butanediol (hereinafter referred to as 1,4-BG) (Japanese Tokkyo Kokai Koho No. 30695/1978) but this proposed process entails a sacrifice of the mechanical property of the product polyurethane elastomer so that the above-mentioned problems still remain to be solved.

It might also be contemplated to blend a low molecular weight triol, such as trimethylolpropane (hereinafter referred to as TMP), with BHEB or the like and use the blend as the curing agent but investigations made by the inventors of the present invention revealed that addition of TMP not only results in a reduced tear strength of the product polyurethane elastomer but as apparent from an increased loss tangent (tan δ) in the rubber region in the determination of the temperature variance of dynamic viscoelasticity, a reduced dynamic performance, such as a reduced roll running life.

SUMMARY OF THE INVENTION

The inventors of the present invention discovered after much research done on the basis of the above finding that a polyurethane elastomer having excellent mechanical properties can be successfully provided, safely and without health hazards and with good workability, by reacting either a polyisocyanate and a polyol, or a prepolymer obtainable by reacting said polyisocyanate with said polyol, with a diol, such as BHEB, and a triol having a hydroxyl equivalent weight of 60 to 500. Further research resulted in establishment of the present invention.

The present invention is, therefore, directed to a process for producing a polyurethane elastomer which comprises reacting (1) either a polyisocyanate and a polyol or an isocyanato-terminated prepolymer obtainable by reacting said polyisocyanate with said polyol, with (2) a diol of the general formula

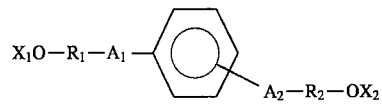

wherein $A_1$ and $A_2$ are the same or different and each represents a bond, —O— or —COO—; $R_1$ and $R_2$ are the same or different and each represents $C_{1-6}$ alkylene; $X_1$ and $X_2$ are the same or different and each represents H or hydroxyalkyl and (3) a triol having a hydroxyl equivalent weight of 60 to 500, and to a polyurethane elastomer curing composition comprising said diol (2) and triol (3).

DETAILED DESCRIPTION OF THE INVENTION

While the present invention can be reduced to practice in whichever of the one-shot mode wherein all of a polyisocyanate, a polyol and a curing agent are reacted together in one operation and the prepolymer mode in which an isocyanate-terminated prepolymer, prepared by reacting a polyisocyanate with a polyol, with a curing agent, the prepolymer mode is particularly advantageous.

The polyisocyanate which can be used in the present invention is not particularly limited and may be selected from among a variety of aromatic, aralicyclic, aliphatic and alicyclic polyisocyanates commonly used in the production of polyurethane resins, such as 2,4-tolylene diisocyanate, 2,6-tolylene diisocyanate, mixtures thereof (e.g. 80/20, 65/35, etc., by weight), 4,4'-diphenylmethane diisocyanate, m-phenylene diisocyanate, p-phenylene diisocyanate, xylylene diisocyanate, tetramethylene diisocyanate, hexamethylene diisocyanate, lysine diisocyanate ester, 1,4-cyclohexylene diisocyanate, 3,3'-dimethyl-4,4'-biphenylene diisocyanate, 3,3'-dimethoxy-4,4'-biphenylene diisocyanate, tetramethylxylylene diisocyanate, 3,3'-dichloro-4,4'-biphenylene diisocyanate, 1,5-naphthalene diisocyanate, 1,5-tetrahydronaphthalene diisocyanate, isophorone diisocyanate, hydrogenated xylylene diisocyanate, hydrogenated 4,4'-diphenylmethane diisocyanate, etc. and the corresponding carbodiimide-modification products, biurets, dimers, trimers and so on. These compounds can be used alone or as a mixture of two or more species.

Among the above polyisocyanates, aliphatic and aromatic polyisocyanates are preferred, and particularly from the standpoint of mechanical strength of the product polyurethane elastomer, aromatic polyisocyanates and, above all else, 4,4'-diphenylmethane diisocyanate is recommendable.

The polyol which can be employed in the present invention includes a variety of polyols which are commonly used in the production of polyurethane resin, including inter alia low molecular weight diols such as ethylene glycol, diethylene glycol, triethylene glycol, 1,2-propylene glycol, 1,3-butylene glycol, 1,4-butylene glycol, 1,6-hexanediol, diethylene glycol, dipropylene glycol, etc., polyether polyols obtainable on addition of one or more of said low molecular diols to one or more members of alkylene oxides such as ethylene oxide, propylene oxide, butylene oxide, etc. and cyclic ethers such as tetrahydrofuran etc., polyester polyols obtainable on condensation of one or more of said low molecular weight diols with one or more dibasic acids such as malonic acid, maleic acid, succinic acid, adipic acid, tartaric acid, pimellic acid, sebacic acid, oxalic acid, phthalic acid, terephthalic acid, isophthalic acid, etc., polyester polyols obtainable on cleavage of cyclic esters such as ε-caprolactone, γ-valerolactone, etc., and hydroxy-terminated polybutadiene diols. These polyols can be used alone or as a mixture of two or more species.

Among the above-mentioned polyols, polyester diols such as polypropylene glycol, polytetramethylene ether glycol, polyethylene adipate, polypropylene adipate, etc. and their mixtures with said low molecular weight diols are preferred.

The molecular weights of such polyols are generally about 300 to 10,000 and preferably about 350 to 5,000.

The isocyanate-terminated prepolymer which is used in the present invention can be produced by reacting said polyol with an excess of said polyisocyanate. A typical production process may comprise adding the polyol gradually to the polyisocyanate with stirring in a nitrogen stream with the reaction temperature being controlled below about 85° C. and, thereafter, allowing the reaction to continue at about 80° C. for 1 to several hours, whereby the desired isocyanate-terminated prepolymer is obtained.

The unreacted polyisocyanate monomer, if necessary, may be removed from the reaction mixture with a means, such as distillation, extraction etc.

Generally, the proportions of said polyisocyanate and polyol in component (1) and the proportions of the polyisocyanate and polyol for the preparation of said prepolymer are both in the range of about 1.3 through 3.0, preferably about 1.8 to 2.2, in terms of NCO/OH ratio.

In the production process according to the invention, a polyurethane elastomer curing composition comprising said diol (2) and triol (3) is used as the curing agent to be reacted with said component (1).

The diol (2) to be used in the present invention can be represented by the following general formula.

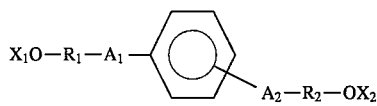

wherein $A_1$ and $A_2$ are the same or different and each represents a bond, —O— or —COO—; $R_1$ and $R_2$ are the same or different and each represents $C_{1-6}$ alkylene; $X_1$ and $X_2$ are the same or different and each represents H or hydroxyalkyl.

Referring to the above formula, the $C_{1-6}$ alkylene, represented independently by $R_1$ and R2, is a straight-chain or branched alkylene group, such as methylene, ethylene, trimethylene, tetramethylene, pentamethylene, hexamethylene, ethylethylene, propylene, etc., and among them, those containing 1 to 4 carbon atoms are preferred.

The hydroxyalkyl, represented independently by $X_1$ and $X_2$, is a group which forms as a hydroxyl group is bound to an alkylene group, namely a $C_{1-6}$ straight-chain or branched alkylene group. Specific examples of such alkylene group include the alkylenes mentioned for $R_1$ and $R_2$ hereinbefore.

The above-mentioned diol includes, among others, 1,2-, 1,3- and 1,4-bis(β-hydroxyethyl)benzenes and mixtures thereof, 1,2-, 1,3- and 1,4-bis(β-hydroxypropyl) benzenes and mixtures thereof, 1-(β-hydroxypropyl)-2- (β-hydroxyethyl)benzene, 1-(β-hydroxypropyl)-3-(β-hydroxyethyl) 1-(β-hydroxypropyl-4-(β-hydroxyethyl)benzene and mixtures thereof, o-, m- and p-xylylene glycols and mixtures thereof; addition polymers obtainable on addition of one or more alkylene oxides, such as ethylene oxide, propylene oxide, butylene oxide, etc., to one or more bifunctional phenols such as resorcinol, hydroquinone, etc., and compounds obtainable on dehydrative condensation of one or more aromatic dibasic acids, such as terephthalic acid, isophthalic acid, phthalic acid, 4,4'-, 2,4- and 2,2'-biphenylcarboxylic acids, etc., with $C_{10}$ species of the low molecular diol which can be used in component (1). These diols can be used alone or as a mixture of 2 or more species.

Among the above-mentioned diols, those species of bis(β-hydroxyethoxy)benzene, bis(β-hydroxyethyl) terephthalate, xylylene glycol, bis(β-hydroxyethyl)benzene, etc. which have terminal hydroxyl groups in para positions are preferred.

The triol (3) to be used in the present invention is a triol having a hydroxyl equivalent weight of 60 to 500, preferably 100 to 300. If the hydroxyl equivalent weight is less than 60, the tear strength and dynamic performance of the polyurethane elastomer tend to be adversely affected, while the use of a triol with a hydroxyl equivalent weight of more than 500 may result in a reduced mechanical (particularly tensile) strength of the polyurethane elastomer.

The triol (3) which can be used includes trifunctional polyether polyols which are obtainable on random or block addition reaction between one or more low molecular weight triols, such as trimethylolpropane, glycerol, triisopropanolamine, etc., and one or more alkylene oxides, such as ethylene oxide, propylene oxide, butylene oxide, etc., trifunctional polyester polyols which are obtainable on addition reaction between one or more of said low molecular weight triols and one or more cyclic esters such as C-caprolactone, γ-valerolactone, etc., and hydroxyl-containing fatty acid esters (such as castor oil) which are products of condensation between one or more of said low molecular weight triols and one or more hydroxyl-containing fatty acids. These triols can be used alone or in combination.

In the present invention, said diol (2) and triol (3) are used preferably in a weight ratio of 1:0.05 through 1.5 and, for still better results, 1:0.1 through 1.0. If the proportion of the diol exceeds the above range, the depressing effect on the melting point of the curing composition will be inadequate so that there may occur the problem of poor workability. On the other hand, a large proportion of the triol in excess of the above range may detract from the mechanical properties (such as tensile strength and tear strength) of the product polyurethane elastomer.

The curing composition of the present invention may contain, in addition to said diol (2) and triol (3), other polyols and/or polyamines, both not less than bifunctional, within the proportional range not adversely affecting the characteristics of the invention. Such polyols include $C_{1-10}$ species of the low molecular weight diol which can be used for component (1) and low molecular weight triols such as trimethylolpropane, glycerol, triisopropanolamine and so on. As said polyamines, there may be mentioned the known MOCA substitute amines and polyamines which are not suspected of oncogenicity, such as 1,2-ethane-bis(o-chloroaniline), 1,3-propane-bis-(o-chloroaniline), trimethylene glycol di-p-aminobenzoate, methyl 4-methyl-3,5-diaminobenzoate, 4,4'-methylenedianthranylic esters (e.g. dimethyl, diethyl and diisopropyl esters), bis(2-methyl-4-aminophenyl)methane, bis(3-methyl-4-aminophenyl)methane, bis(2-ethyl-4-aminophenyl)methane, bis(3-ethyl-4-aminophenyl)methane, 4,4'-diaminodiphenylmethane and so on.

The total amount of said diol (2) and triol (3) in the polyurethane elastomer curing composition of the present invention is not less than about 60% by weight, preferably not less than about 80% and most recommendably 100% by weight relative to the total weight of the curing composition.

The reacting ratio of said component (1), diol (2) and triol (3) is preferably such that the equivalent ratio of hydroxyl to isocyanate (OH/NCO) in the total system is 0.8 through 1.20, preferably 0.9 through 1.10. If this ratio is outside the above range, the mechanical strength of the product polyurethane elastomer may not be sufficiently high.

In the production of the polyurethane elastomer according to the present invention, there may be employed, where necessary, a curing catalyst and various additives such as an antioxidant, ultraviolet absorber, color protectant, hydrolysis inhibitor, antifungal agent, flame retardant, extender, filler (e.g. calcium carbonate, silica, talc, etc.), plasticizer (e.g. dioctyl phthalate), organic solvent and colorant.

The curing catalyst which can be employed includes, among others, organometal salts such as dibutyltin dilaurate, stannous octoate, etc., quaternary ammonium salts such as triethylbenzylammonium chloride, tetramethylammonium chloride, etc., tertiary amines such as triethylamine, tripropylamine, tributylamine, benzyldimethylamine, N-ethylmorpholine, 2-methylimidazole, 2-methyl-4-ethylimidazole, etc., metal halides such as aluminum chloride, ferric chloride, boron trifluoride, zinc chloride, etc., organic acids such as adipic acid, salicylic acid, benzoic acid, etc., and other curing catalysts which are commonly used in the production of polyurethane resin.

The amount of the curing catalyst is not critical but is generally not more than 5% by weight and preferably about 0.01 to 1% by weight.

In accordance with the present invention, the desired polyurethane elastomer can be produced by heating either an excess of a polyisocyanate and a polyol or an isocyanate-terminated prepolymer obtainable by reacting said polyisocyanate with said polyol, i.e. component (1), adding thereto a previously melted curing component, blending them well to prepare a molten blend, optionally degasing the blend under reduced pressure, pouring it into a metal mold, heating it to cure at a temperature of about 100° to 140° C. and withdrawing the resulting product from the mold. The above-mentioned curing catalyst and additives can be incorporated at an optional stage prior to curing, for example in the course of preparation of said prepolymer, at the stage where said curing composition is melted by heating or at the stage where said component (1) is blended with said curing composition.

Since the diol (2) and the triol (3) are used in combination as the curing agent in the present invention, the melting temperature for the curing agent can be decreased as compared with the case in which the diol (2) is used alone. Therefore, the preheating of component (1) and the melting of the curing agent can be carried out at comparatively low temperatures in actual production. Thus, while the preheating temperature for component (1) and the melting temperature for the curing agent can be selected according to the melting or softening points of component (1) and curing agent, the preheating temperature for component (1) may for example be about 80° to 120° C., preferably about 80° to 100° C., and the melting temperature for the curing agent may for example be about 90° to 130° C., preferably about 90° to 20° C. Thus, compared with the case in which the diol (2) is used alone, the preheating and melting operations can be performed at temperatures lower by about 5° to 30° C. Furthermore in order to enhance the homogeneity of the polyurethane elastomer, the metal mold is preferably preheated to about 100° to 140° C. prior to casting.

The polyurethane elastomer generally becomes ready for release from the mold in one to a few hours of curing reaction but it may be further cured at said curing temperature for about 4 to 24 hours and, if necessary, be allowed to ripen at room temperature for about 3 to 7 days.

The polyurethane elastomer produced in accordance with the invention can be used with advantage in a broad variety of applications such as industrial rolls and belts, business machine parts, etc. where high mechanical, thermal and chemical performances are essential.

EXAMPLES

The following examples as well as comparative examples are intended to describe the present invention in further detail and should by no means be construed as defining the scope of the invention. In the examples, all "parts" and "%" are by weight.

Example 1

Production of Prepolymer

To 100 parts of polytetramethylene ether glycol with an average molecular weight of 1,000 [PTMEG 1000, manufactured by Mitsubishi Kasei Corporation] was added 50 parts of 4,4'-diphenylmethane diisocyanate and the mixture was reacted in a nitrogen stream at 80° C. with stirring for 4 hours to give a prepolymer (A) having an NCO content of 5.6% and a viscosity of 1,700 cps (80° C.).

Production of Polyurethane Elastomer

One-hundred parts of the prepolymer (A) obtained as above was preliminarily heated to 100° C. and mixed with 13.5 parts of a curing composition prepared by melting 70 parts of bis(β-hydroxyethoxy)benzene (BHEB) and 30 parts of a trimethylolpropane-type trifunctional polyether polyol (Aktocol IR-96, manufactured by Takeda Chemical Industries, Ltd.) at 120° C. and the resulting mixture was stirred for 1 minute. This mixture was subjected to deaeration under reduced pressure for 1 minute and poured in a stainless steel mold preheated to 110° C., in which it was caused to cure at the same temperature for 20 hours to give a polyurethane elastomer. This polyurethane elastomer exhibited excellent rubber elasticity at room temperature.

Examples 2 through 7

Using the prepolymer (A) obtained in Example 1 and the curing compositions shown in Table 1, polyurethane elastomers were prepared by the same procedure as Example 1.

Comparative Example 1

Using the prepolymer (A) obtained in Example 1 and the curing composition shown in Table 2, a polyurethane elastomer was prepared in the same manner as Example 1 except that the preheating of the prepolymer was carried out at 120° C.

Incidentally, when prepolymer (A) was preheated at 100° C. as in Examples, crystals of BHEB separated out on admixture with the curing composition to cause poor blending so that no practically useful polyurethane elastomer could be obtained.

Comparative Example 2

Using the prepolymer (A) and the curing component shown in Table 2, a polyurethane elastomer was prepared in the same manner as Example 1 except that the prepolymer was preheated at 120° C.

Incidentally, when the prepolymer was preheated to 100° C. as in Examples, crystals of p-xylylene glycol (P-XG) separated out in the mixture to cause poor blending so that no practically useful polyurethane elastomer could be obtained.

Comparative Examples 3 and 4

Using the prepotymer (A) obtained in Example 1 and the curing components shown in Table 2, polyurethane elastomers were prepared in the same manner as Example 1.

Reference Example 1

Using 100 parts of a commercial isocyanate-terminated prepolymer (Takenate L-2710, NCO content 4.2%, manufactured by Takeda Chemical Industries, Ltd.) and, as the curing agent, 12 parts of 4,4'-methylenebis-2-chloroaniline (MOCA), a polyurethane elastomer was prepared in the same manner as Example 1.

The physical properties of the polyurethane elastomers obtained in Examples 1–8, those obtained in the first-mentioned reactions of Comparative Examples 1–4 and those obtained in Reference Example 1 are shown in Tables 1 and 2.

[TABLE 2]

|  | Comparative Example | | | | Reference Example |
|---|---|---|---|---|---|
|  | 1 | 2 | 3 | 4 | 1 |
| Composition (parts) | | | | | |
| Prepolymer (A) | 100 | 100 | 100 | 100 | |
| Takenate L-2710 | | | | | 100 |
| BHEB | 12.7 | | 8.1 | 6.3 | |
| P-XG | | 8.8 | | | |
| Aktocol IR-96 | | | | | |
| Placcel 305[1] | | | | | |
| Placcel 308[2] | | | | | |
| 1,4-BG | | | 2.1 | | |
| TMP | | | | 2.8 | |
| MOCA | | | | | 12.0 |
| Melting point of curing component (°C.) | 107 | 115 | 96 | 98 | 98 |
| Heating temperature of prepolymer (°C.) | 120 | 120 | 100 | 100 | 100 |
| Physical properties of elastomer | | | | | |
| Hardness (JIS A)[3] | 96 | 96 | 90 | 90 | 91 |
| Tensile strength (kg/m$^2$)[4] | 235 | 257 | 201 | 232 | 322 |
| 300% Modulus (kg/m$^2$)[4] | 133 | 133 | 128 | 125 | 174 |
| Tear strength (kg/cm)[5] | 98 | 110 | 88 | 71 | 77 |
| Impact resilience (%) | 59 | 60 | 54 | 53 | 50 |
| Tan δ (100° C.)[6] | 0.018 | 0.021 | 0.075 | 0.123 | 0.018 |
| Roll burst linear pressure (kg/cm)[7] | 100 | 100 | 60 | 60 | 100 |

Notes)

[TABLE 1]

|  | Example | | | | | | |
|---|---|---|---|---|---|---|---|
|  | 1 | 2 | 3 | 4 | 5 | 6 | 7 |
| Composition (parts) | | | | | | | |
| Prepolymer (A) | 100 | 100 | 100 | 100 | 100 | 100 | 100 |
| Takenate L-2710 | | | | | | | |
| BHEB | 9.4 | 11.3 | 7.5 | | | 9.5 | 9.5 |
| P-XG | | | | 7.0 | 7.9 | | |
| Aktocol IR-96 | 4.1 | 1.7 | 6.6 | 3.3 | 1.7 | | |
| Placcel 305[1] | | | | | 5.9 | | |
| Placcel 308[2] | | | | | | | 9.2 |
| 1,4-BG | | | | | | | |
| TMP | | | | | | | |
| MOCA | | | | | | | |
| Melting point of curing component (°C.) | 93 | 99 | 87 | 101 | 103 | 92 | 91 |
| Heating temperature of prepolymer (°C.) | 100 | 100 | 100 | 100 | 100 | 100 | 100 |
| Physical properties of elastomer | | | | | | | |
| Hardness (JIS A)[3] | 92 | 95 | 88 | 89 | 92 | 91 | 89 |
| Tensile strength (kg/m$^2$)[4] | 302 | 314 | 281 | 306 | 339 | 311 | 291 |
| 300% Modulus (kg/m$^2$)[4] | 153 | 153 | 118 | 152 | 139 | 162 | 159 |
| Tear strength (kg/cm)[5] | 115 | 136 | 99 | 97 | 110 | 106 | 101 |
| Impact resilience (%) | 56 | 61 | 53 | 63 | 64 | 61 | 62 |
| Tan δ (100° C.)[6] | 0.013 | 0.015 | 0.011 | 0.016 | 0.018 | 0.014 | 0.017 |
| Roll burst linear pressure (kg/cm)[7] | 120 | 120 | 100 | 100 | 120 | 120 | 100 |

[TABLE 2]-continued

|  | Comparative Example | | | | Reference Example |
|---|---|---|---|---|---|
|  | 1 | 2 | 3 | 4 | 1 |

[1]Polycaprolactone type trifunctional polyester polyol, OH equivalent: 130, manufactured by Daicel Chemical Industries, Ltd.
[2]Polycaprolactone type trifunctional polyester polyol, OH equivalent: 184, manufactured by Daicel Chemical Industries, Ltd.
[3]Measured with a spring type A hardness tester in accordance with JIS K6301
[4]Measured with a No. 3 dumbbell in accordance with JIS K6301
[5]Measured with a Type B dumbbell in accordance with JIS K6301
[6]The tan δ value at 100° C. as measured with a visoelastic spectrometer at a frequency of 10 Hz and a velocity of 5° C./min.
[7]Using a roll running tester, the testpiece is caused to revolve at a peripheral speed of 300 m/min and the linear pressure is increased from 60 kg/cm in hourly increments of 20 kg/cm. The linear pressure at which the testpiece bursts is recorded.

It is apparent from Tables 1 and 2 that the melting temperature of the curing component containing both a diol and a triol according to the invention (e.g. BHEB +Aktocol IR-96, P-XG+Aktocol IR-96, BHEB+Placcel 305 and BHEB+Placcel 308) is lower than the melting temperature of the curing agent containing the corresponding diol (e.g. BHEB or P-XG) alone and that, therefore, lowering the preheating temperature of the prepolymer does not cause crystallization. Thus, the curing composition of the invention is clearly superior in workability. It is also apparent that compared with the polyurethane elastomers obtained with. BHEB -1,4-BG or BHEB-TMP, the polyurethane elastomer produced by using the curing composition of the invention is superior in mechanical properties such as tensile strength and tear strength, smaller in the tan δ value at 100° C. and greater in roll running endurance.

Since the polyurethane elastomer curing composition containing a specified diol (2) and a triol (3) having a hydroxyl equivalent weight of 60 to 500 according to the present invention is lower in melting temperature than the curing component comprising the same diol (2) alone, the preheating temperatures for the respective components need not be increased so that workability is much improved.

Moreover, in accordance with the process for producing a polyurethane elastomer according to the present invention, there can be obtained a polyurethane elastomer with improved tensile strength, tear strength and other mechanical properties, so that the polyurethane elastomer of the invention can be advantageously utilized for the manufacture of a variety of elastomeric products in a diversity of fields including industrial rolls and belts, business machine parts, etc. which call for sophisticated mechanical, thermal and chemical characteristics.

What is claimed is:

1. A polyurethane elastomer curing composition which consists of a diol of the general formula

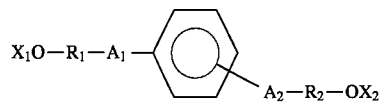

wherein $A_1$ and $A_2$ are the same or different and each represents a bond, —O— or —COO—; $R_1$ and $R_2$ are the same or different and each represents $C_{1-6}$ alkylene; and $X_1$ and $X_2$ are the same or different and each represents H or hydroxylalkyl, and a triol having a hydroxyl equivalent weight of 60 to 500 and being selected from the group consisting of (a) a trifunctional polyether polyol obtained by random or block addition reaction between at least one of trimethylolpropane or glycerol and at least one alkylene oxide, (b) a trifunctional polyester polyol obtained by addition reaction between at least one of trimethylolpropane or glycerol and at least one cyclic ester and (c) a hydroxyl-containing fatty acid ester which is the product of condensation between at least one of trimethylolpropane and glycerol and at least one hydroxyl-containing fatty acid, the weight ratio of the diol and the triol being 1:0.05 to 1.5.

* * * * *